United States Patent
Chen

(10) Patent No.: US 7,441,085 B2
(45) Date of Patent: Oct. 21, 2008

(54) MEMORY CONTROL METHOD FOR RESTORING DATA IN A CACHE MEMORY

(75) Inventor: Chih-Wei Chen, Taipei (TW)

(73) Assignee: Inventec Corporation (TW)

( * ) Notice: Subject to any disclaimer, the term of this patent is extended or adjusted under 35 U.S.C. 154(b) by 212 days.

(21) Appl. No.: 11/391,779

(22) Filed: Mar. 28, 2006

(65) Prior Publication Data

US 2007/0124552 A1     May 31, 2007

(30) Foreign Application Priority Data

Nov. 25, 2005    (TW) .............................. 94141409 A

(51) Int. Cl.
  *G06F 12/00* (2006.01)
  *G06F 1/00* (2006.01)
(52) U.S. Cl. .................... 711/118; 711/162; 713/300
(58) Field of Classification Search ................ 711/118, 711/162; 713/300
  See application file for complete search history.

(56) References Cited

U.S. PATENT DOCUMENTS

| 5,371,872 | A | * | 12/1994 | Larsen et al. | ............... | 711/118 |
| 6,016,531 | A | * | 1/2000 | Rixner et al. | ............... | 711/118 |
| 6,026,471 | A | * | 2/2000 | Goodnow et al. | ........... | 711/137 |
| 2007/0043347 | A1 | * | 2/2007 | Solomita et al. | ............. | 606/33 |

* cited by examiner

*Primary Examiner*—Reginald G. Bragdon
*Assistant Examiner*—Mehdi Namazi
(74) *Attorney, Agent, or Firm*—Peter F. Corless; Steven M. Jensen; Edwards Angell Palmer & Dodge LLP

(57) ABSTRACT

A memory control method for restoring data in a cache memory is proposed, which is applied in a computer device having Operating System, and the computer device has a spare battery for supplying spare power to go on to store cached data into a cache memory unit, the temporary data can be backed up quickly, seriously and efficiently without significantly modifying a memory management core of the operating system, thereby preventing operational efficiency of the computer device from decreasing, avoiding the designing and fabricating cost from adding, and also avoiding the problem such that the cached content can not be stored since memory has been initialized by operating system once the system is started every time, as well even making the temporary data in the cache memory restored to disk without influencing structure of Operating System itself, when the computer device is restarted after powering off abnormally.

7 Claims, 1 Drawing Sheet

MEMORY CONTROL METHOD FOR RESTORING DATA IN A CACHE MEMORY

BACKGROUND OF THE INVENTION

1. Field of the Invention

The present invention relates generally to a technology for protecting a temporary data from being lost due to power off, and more particularly, to a memory control method for restoring data in a cache memory, which is employed spare power to supply the cache memory to go on to store data.

2. Description of Related Art

With rapid development of information technology, computer has become an important source for acquiring information, and an important data storage medium. Wherein, operating system is essential to a computer device, because it can provide much more convenience for a user to operate the computer with the aid of the operating system, thus, whether the operating system design is good or bad has significantly impacted on operating convenience for a user and adaptability for the hardware itself, one of the most important parts of operating system is data access, when operating the computer, a cache memory of the computer is to temporarily store a used data, so as to upgrade operating efficiency of the computer, so is the principle of a computer acting as a server; however, when important data being in use is lost for powering off, larger loss will be produced to an individual, an enterprise user, or business operator, wherein, money is the most severe loss, accordingly, there exists a strong need in the art about how to assure that data in the cache memory can not be lost when the computer device is suddenly powered off.

As described above, in order to protect data from being damaged when taking place the above status, a battery backup technique and a correlative hardware device is accordingly produced, the technique is to rewrite a Linux memory management mechanism, and then employ battery to supply spare power to store the temporary data in the memory, such a memory management mechanism is to define a continuous block contained in the memory to allow all of the temporary datum to access in the defined block, once the computer is powered off, the computer will read datum that have not been written back to disk from the continuous block and write them back to disk when system is restarted next time, however, by such a manner, the memory management core in the computer must be changed, and address of the memory block must be redefined, if error is produced when changing the memory management core in the computer, not only the cached datum can not be written back, and error may occur during executing a general program, such result is more severe than that of data lost, moreover, the temporary datum are restored in the cache memory by virtue of such a manner, much more manpower and time will be occupied.

Therefore, there exists a strong need in the art for building a more secure method for restoring temporary datum to disk to solve the drawback of the above-described prior art, so as to make the cache memory datum restored more readily without changing memory management core, thereby reducing the possibility of impact on system.

SUMMARY OF THE INVENTION

Accordingly, it is an objective of the present invention to solve the drawbacks of the above prior art by providing a memory control method for restoring data in a cache memory, which is applied in a computer device having Linux Operating System, and the computer device has a spare battery for supplying spare power to go on to store data in a cache memory and support the operating steps for detecting whether datum are restored after system is restarted.

It is another objective of the present invention to provide a memory control method for restoring data in a cache memory, so as to make the computer device automatically finish restoring datum that are temporarily stored in the memory quickly and securely by virtue of the memory that can be automatically backed up.

It is a further objective of the present invention to provide a memory control method for restoring data in a cache memory which can back up datum in time, thereby the spare datum can be restored without changing memory management structure of Linux system itself.

In order to attain the object mentioned above and the others, a memory control method for restoring data in a cache memory is provided according to the present invention, which is applied in a computer device having Linux Operating System, and the computer device has a battery for supplying spare power to a memory, so that datum temporarily stored in the memory can be stored continuously with the aid of the spare power supplied by the battery, the computer device also has a nonvolatile memory unit for recording initial address in the cache memory distributed when computer is started last time, and searching the temporary data status by a list address and executing the operating steps for detecting and then restoring datum after restarting, the memory control method for restoring data in a cache memory according to the present invention includes: firstly judging whether last time the computer device is powered off abnormally by a hardware status register, if not, executing initialization of memory and cache, and also performing a program for staring computer normally, after performing the program for staring computer normally, memory management structure of the Linux system is to define a block for storing various scattered list addresses corresponding to the cached temporary data, wherein the list addresses record list structure and the corresponding address, after defining the memory block for storing cached temporary datum, the nonvolatile memory unit is employed to record initial address of the cached management linked list for restoring the temporary datum in the memory after the computer device is powered off abnormally; if it is learned from a hardware status register that last time the computer device is powered off abnormally before initializing memory, acquiring list address of the cached management linked list defined by Linux system memory management structure when the computer is started last time from the nonvolatile memory unit, then judging and reading whether list data and the status element in the temporary block indicate that data has been written back to disk, if yes, going on to read and judge the next list of data status element, if not, reading and writing the temporary data corresponding to the address pointed by the status elements to disk, after finishing restoring all of datum in the register, beginning to perform a program for staring computer normally, then initializing address of the memory and the cache memory by virtue of Linux system, so as to redistribute memory block, and recording the buffer head address into the nonvolatile memory unit, so that temporary datum in the memory can be restored when the computer device is restarted after powering off abnormally.

In addition, the present invention can protect the temporary datum from being lost when Linux system is powered off abnormally, and even can restore the temporary datum in the cache memory to disk, so that design cost of the system can be efficiently reduced, and memory management core of Linux system can also be avoided from being modifying significantly, which may cause that system operational efficiency is decreased and temporary datum addresses are aimed wrong, moreover, the mistake possibility of the design of the cache memory can be reduced depending on design of the memory management core of Linux system, and when it is learned from detection of a hardware status register that the system is powered off abnormally last time, the memory control method for restoring data in a cache memory is triggered to synchronously restore the cached temporary datum that have not yet been restored back to disk.

Therefore, the memory control method for restoring data in a cache memory can protect important datum from being lost when system is powered off abnormally, by virtue of the present invention, the temporary data can be backed up quickly, seriously and efficiently without significantly modifying a memory management core of the Linux system, so as to protect the cached temporary datum, thereby preventing operational efficiency of the computer device from decreasing, avoiding the designing cost from adding, and also avoiding the problem such that the cached content can not be stored since memory has been initialized by Linux system once the system is started every time, as well even making the temporary data restored back to disk when the computer device is restarted after powering off abnormally last time.

DETAILED DESCRIPTION OF PREFERRED EMBODIMENTS

Figure 1:
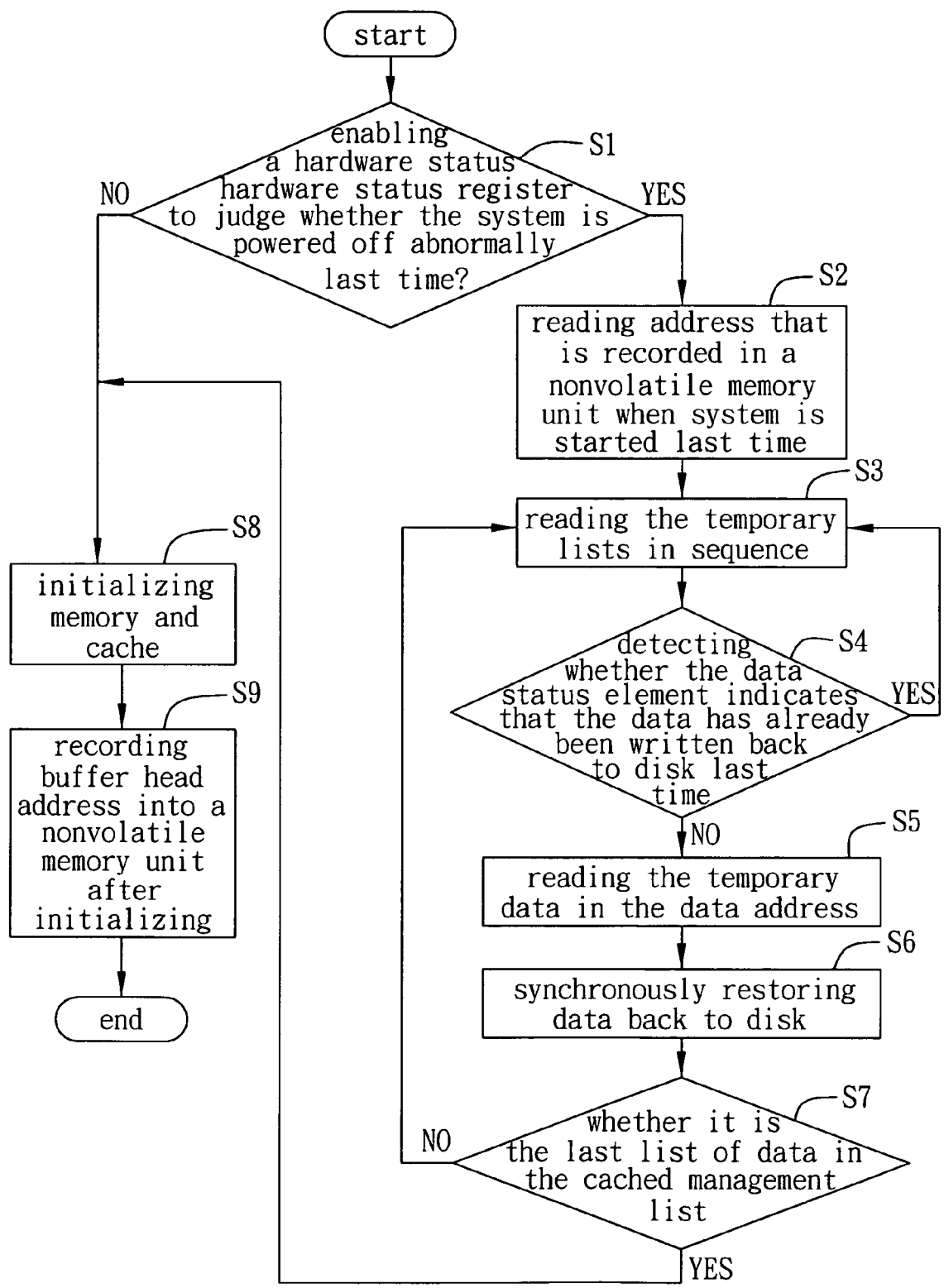
FIG. 1 depicts is a flow chart of an implementing process according to the present invention.

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be devised without departing from the spirit of the present invention.

With reference to FIG. 1, shown is a flow chart of an implementing process according to the present invention, as shown in the figure, firstly, monitoring power supply status of the last time recorded by a hardware status register (not illustrated) included in the computer device to judge whether system is powered off abnormally last time, if not, directly proceeding to step S8 to execute initialization of memory and cache, at step S8, memory and the cache memory address blocks in the Linux system are redistributed, memory management structure of the Linux system is to define a memory block for storing various scattered lists of the cached temporary datum, wherein the list addresses record list structure and the corresponding address, after the system defines the memory block for storing cached temporary datum, the nonvolatile memory unit (not illustrated) is employed to record initial address of the cached management linked list for restoring the temporary datum in the memory after the computer device is powered off abnormally, hereafter, proceeding to step S9, initializing address of the memory and the cache memory by virtue of Linux system, so as to redistribute memory block, and recording the buffer head address into the nonvolatile memory unit. Otherwise, if the hardware status register records that the system is powered off abnormally last time, proceeding to step S2 to trigger the memory control method for restoring data in a cache memory, so as to read buffer head address of the cached management linked list defined by the memory management structure of Linux system when system is started last time and recorded in the nonvolatile memory unit, then proceeding to step S3.

At step S3, making the computer device read list address in sequence, then proceeding to step S4.

At step S4, making the computer device detect whether list data and the status element in the temporary block indicate that data has already been written back to disk, if yes, returning to step S3, and going on to read and judge the next list of data status element, if not, reading the temporary data corresponding to the address pointed by the status elements, proceeding to step S5.

At step S5, reading the temporary datum in the data address, then proceeding to step S6.

At step S6, writing the read temporary datum back to a disk synchronously, then proceeding to step S7.

At step S7, going on to read and judge the next list of data and detect whether it is the last list of data, if all of datum in the register are restored, proceeding to step S8, beginning to perform a program for staring computer normally, then proceeding to step S9, initializing address of the memory and the cache memory by virtue of Linux system, so as to redistribute memory block, and recording the buffer head address into the nonvolatile memory unit, so that temporary datum in the memory can be restored when the computer device is restarted after powering off abnormally, if not, returning to step S3.

Accordingly, compared with the prior art, the memory control method for restoring data in a cache memory according to the present invention mainly employs a hardware status register to detect power supply status of the last time and judge whether it is powered off abnormally, so as to protect datum in the cache memory in time, then judging status of the cached datum and restoring the datum back to disk when the system is restarted next time, so as to protect important datum from being lost when powering off abnormally, and even reduce time, manpower and cost required in design. Thus, by virtue of the present invention, the temporary data can be backed up quickly, seriously and efficiently without significantly modifying a memory management core of the Linux system, so as to protect the cached temporary datum, thereby preventing operational efficiency of the computer device from decreasing, avoiding the designing cost from adding, and also avoiding the problem such that the cached content can not be stored since memory has been initialized by Linux system once the system is started every time, as well even making the temporary data restored back to disk without influencing structure of Linux Operating System itself, when the computer device is restarted after powering off abnormally last time.

What described above is the preferred embodiment of the present invention as illustrative, but it is not to limit the scope of the present invention, i.e., other changes in deed can be implemented in the present invention, accordingly, all modifications and variations completed by those skilled in the art according to the spirit and technical principle in the disclosure of the present invention should fall within the scope of the appended claims.

What is claimed is:

1. A memory control method for restoring data in a cache memory, using a battery for supplying spare power to store cached data into a cache memory unit when a computer device is suddenly powered off, so as to synchronously write back the cached data in the memory unit to a disk when a system is restarted next time, the method comprising:

(1) enabling a nonvolatile memory unit in the computer device to record a buffer head address distributed by a memory management core in an operating system;

(2) enabling the computer device to employ a hardware status register to judge whether the computer device was powered off abnormally, and if yes, triggering a program to write the cached data back to the disk;

(3) enabling the computer device to read list addresses of various cached temporary datum distributed in the memory unit that are recorded by the buffer head address in the nonvolatile memory unit;

(4) after triggering a program to write the cached data back to the disk, searching data status elements from a list address of the cached temporary data after the buffer head address, and judging whether the data status element indicate that the data was written back to the disk, if yes, stopping writing data back to the disk, and going on to read and judge the next list of data status element, and if not, immediately and synchronously writing back the cached data pointed to by the status elements in the list address to disk, until finishing searching all of the status elements recording list addresses of the various cached temporary datum distributed in the memory unit; and (5) after synchronously finishing storing the cached data, beginning to perform normal initialization and the cached distribution mechanism for the memory unit, and recording the buffer head address into the nonvolatile memory unit after finishing distribution, so that temporary datum in the memory can be restored when the computer device is restarted after powering off abnormally.

2. The method of claim 1, wherein the hardware status register is used to store various statuses of hardware for the computer device to read and judge the correlative information of what is recorded.

3. The method of claim 1, wherein the nonvolatile memory unit is used to record the buffer head address distributed by the memory management core in the operating system.

4. The method of claim 3, wherein the buffer address is an initial address of a cached management linked list in the operating system.

5. The method of claim 3, wherein the buffer address is any one of a plurality block addresses in the memory unit.

6. The method of claim 5, wherein the buffer address has status elements recording whether the data is written back to disk.

7. The method of claim 6, wherein the status elements are addresses for pointing to content blocks in the cached temporary data.

* * * * *